United States Patent [19]

Tlustakova et al.

[11] Patent Number: 4,634,604

[45] Date of Patent: Jan. 6, 1987

[54] METHOD FOR PRODUCING A BIOCOMPATIBLE LAYER ON THE SURFACE OF PARTICLES OF POROUS SYNTHETIC SORBENTS

[75] Inventors: Marie Tlustakova; Jiri Horak, both of Prague; Josef Vavrouch, Libice n/Cidl.; Jiri Kulisek, Zasmuky; Jaroslav Kalal, Prague, all of Czechoslovakia

[73] Assignee: Ceskoslovenska adademie ved, Czechoslovakia

[21] Appl. No.: 622,671

[22] Filed: Jun. 20, 1984

[30] Foreign Application Priority Data

Jun. 23, 1983 [CS] Czechoslovakia ............... 4619-83

[51] Int. Cl.$^4$ .............................................. B01J 13/02
[52] U.S. Cl. ............................... 427/213.33; 210/692; 210/927; 424/33; 427/213.34; 428/402.22; 428/407
[58] Field of Search .................. 427/213.33, 213.34; 428/402.22, 407; 424/33

[56] References Cited

U.S. PATENT DOCUMENTS

| | | | |
|---|---|---|---|
| 3,576,760 | 4/1971 | Gould et al. | 424/33 X |
| 3,787,522 | 1/1974 | Dickie et al. | 428/407 |
| 4,021,364 | 5/1977 | Speiser et al. | 427/213.34 X |
| 4,187,194 | 2/1980 | Wellman et al. | 428/402.22 X |
| 4,239,646 | 12/1980 | Vincent et al. | 427/213.34 X |
| 4,280,923 | 7/1981 | Small et al. | 428/407 X |

*Primary Examiner*—Richard D. Lovering
*Attorney, Agent, or Firm*—Leydig, Voit & Mayer

[57] ABSTRACT

The invention pertains to the method for producing a biocompatible layer on the surface of particles of porous synthetic sorbents.

An object of the invention consists in the method for producing a biocompatible layer on the surface of particles of porous synthetic sorbents by action of a solution of biocompatible polymer of acrylate or methacrylate type, or of its monomer in the presence of polymerization initiators, on a suspension of sorbent, which is agitated with steam.

The method according to the invention renders a material, the sorption capacity of which is entirely retained. This is due to water, which remains enclosed in the pores of sorbent and enables the sorption of toxins also inside the gel particles. In addition, steam can be prepared completely apyrogenic and thus to secure that the sorbents remain clean inside. Clinical tests reveal that the sorbents coated by the method according to the invention have an excellent hemocompatibility.

6 Claims, No Drawings

METHOD FOR PRODUCING A BIOCOMPATIBLE LAYER ON THE SURFACE OF PARTICLES OF POROUS SYNTHETIC SORBENTS

The invention pertains to the method for producing a biocompatible layer on the surface of particles of porous synthetic sorbents.

A number of situations in internal medicine require removal of toxic compounds, both of the exogenous and endogenous origin, from plasma or blood of a patient. Hemoperfusion represents a very simple method for this purpose, where the patient's blood passes through a suitably chosen sorbent. Such sorbent may be charcoal or a synthetic resin.

Several companies produce recently columns for clinical hemoperfusion on the commercial base. The columns have various shapes, differ in the type of protective hemocompatible layer, but charcoal is used as a sorbent in all cases. The producers use polymeric coatings based on poly(2-hydroxyethyl methacrylate) (Hydron type) (Sandev Co. for the column Hemocol and Kuraray Co. for the column DHP-1) and cellulose or its derivatives (Gambro Co. for the columns Adsorba 300C and 150C).

Columns packed with synthetic sorbents begin to be used most recently, in particular for experimental purposes, however, without the protective hemocompatible layer. Nonionogenic gels based on styrene-divinylbenzene copolymers (type Amberlite XAD-2, XAD-4) or on copolymers of acrylic or methacrylic esters with divinylbenzene (Amberlite XAD-7) are used above all. However, during the passage of blood through these sorbents, as much as 90% of blood platelets and more than 70% leucocytes is get caught on their surface (Rosenbaum J. L., Kramer M. S., Raja R., Winsten S., Dalal F.: Kidney Intern. 10, 341, 1976; Willson R. A., Hofmann A. F., Kuster G. G. R.: Gastroenterology 66, 95, 1974). Some authors even observed an increase of pressure in the column and formation of a blood precipitate (Cooney D. O., Infantolino W., Kane R.: Biomat., Med. Dev. Art. Org. 1979, 433). It is obvious, that such considerable loss of blood-forming elements, which must be compensated by organism, does not allow the treatment of chronic states by repeated perfusions, and that a considerable risk of hemorrhage complications occurs at acute perfusions. Therefore, it has been attempted lately to adapt the surface of these sorbents as well, for example, with albumin (Hughes R., Ton H. Y., Langley P., Davies M., Hanid M. A., Mellon F., Silk D. B. A., Williams R.: Artif. Organs 3, 23, 1979), cellulose acetate, or synthetic polyelectrolytes (de Koning H. W. M., Chamuleau R. A. F. M., Sederel L. C., Bantjes A.: Artif. Liver Support, Proc. Int. Symp. 82, 1980). This modification of sorbent surface improves the compatibility with blood. But a very good hemocompatibility of a coating based on poly(2-hydroxyethyl methacrylate) has not been yet utilized, because such coating cannot be prepared in the same way as on charcoal, with the full sorption capacity preserved, thanks to hydrophobicity of the synthetic resin. Only the outer surface of particles could be utilized for sorption, if a dry gel was coated.

Progress in the coating of polymer sorbents with a hemocompatible polymeric layer is represented by the method according to Czechoslovak Pat. No. 217,253, which consists in filling the pores of sorbent with other solvents and their successive exchange with water in the sorbent, which was already surface-modified.

The said method is time consuming, inconsiderable to the hemocompatible layer and, in addition, a bacterial contamination can be brought into the sorbent pores with solvents. Bacteria remain closed in pores, after coating the sorbent particles with the biocompatible polymeric layer, and may there produce compounds, which cause considerable problems during hemoperfusion by their effects on patient's blood.

The above mentioned shortcomings are avoided in the method for producing a biocompatible layer on the surface of particles of porous synthetic sorbents according to the invention, which consists in the action of a solution of biocompatible polymer of the acrylate or methacrylate type, or of its monomer in the presence of polymerization initiators, on a suspension of sorbent which is agitated with steam.

The styrene-divinylbenzene copolymers (types of Amberlite XAD-2 or XAD-4, Synachrom E5 and the like), copolymers of acrylic or methacrylic esters with divinylbenzene (Amberlite XAD-7 or XAD-8), and also the copolymers of styrene with ethylene dimethacrylate (types of Separon SE), etc., can be advantageously used as sorbents. A suitable size of particles and a suitable density of polymer network are preferred because the low-crosslinked gels could depolymerize in part at elevated temperature. The sorbents of particles size 0.2 to 3 mm are advantageously employed.

The amount of polymer, which forms coating on the sorbent particles, depends on the size of particles only. Such amount of the hydrophilic biocompatible polymer is required on the surface of gel, to form a thin but completely coherent layer.

Alcohols containing 1 to 2 carbon atoms, or their mixtures with water or aqueous solutions of salts, are used as solvents of the biocompatible polymer.

An aqueous medium, i.e. water or aqueous solutions of salts, is used for the suspension of sorbent particles in the process of preparation of the biocompatible layer. The amount of liquid component cannot be precisely defined, because it varies during the purification of sorbent and preparation of polymeric layer. Steam, which is introduced into the suspension, first condenses and thus increases the amount of liquid component. The increase in the content of liquid depends, for example, on temperature of the original suspension, temperature of introduced steam, cooling of the suspension by surroundings, etc. The amount of liquid in the original suspension also depends on the particle size of solid component and the precise determination of the liquid medium in suspension is irrelevant because the sorbent particles are not monodisperse. It is important that the suspension was throughly agitated with introduced steam.

The biocompatible polymer is either a homopolymer of 2-hydroxyethyl methacrylate or its copolymer with a crosslinking agent, advantageously with ethylene dimethacrylate. If the solution of crosslinked poly(2-hydroxyethyl methacrylate) is applied, the amount of a crosslinking agent, preferably ethylene dimethacrylate, is limited by the required solubility of copolymer. However, the amount of crosslinking agent in the resulting copolymer is entirely arbitrary, because a biocompatible layer can be prepared on particles of the sorbent also by a direct polymerization of monomers. In such case, 2-hydroxyethyl methacrylate is advantageously used as a monomer, if desired, in the presence of ethylene dimethacrylate. Watersoluble initiators of the radical polymerization are used to initiate the polymerization, for example, soluble peroxo compounds.

An advantage of the method for producing a biocompatible layer on the surface of sorbent by means of steam is that it is considerate not only to the original uncoated sorbent, but also to the formed polymer layer. Steam, blown into the suspension of sorbent in water or an isotonic solution of sodium chloride, warrants a very efficient agitation and heating of the suspension, nevertheless neither the hemocompatible layer nor the original sorbent are abraded. The sorbent is also freed of last traces of monomers, in particular aromatic ones, which vaporize with steam. In the preparation of the said biocompatible layer, ethanol or methanol, which are components of the poly(2-hydroxyethyl methacrylate) solution, is very rapidly removed by distillation with steam. The hemocompatible layer is thus formed very rapidly and is thin, so that a minimum retardation of diffusion of toxins occurs.

The method according to the invention provides a material, the sorption capacity of which is completely retained. This is because water remains as inclusion in the pores of sorbent and enables the sorption of toxins also inside the gel particles. In addition, steam can be prepared completely apyrogenic and thus to secure that the sorbent remains clean inside.

The intensity of agitation can be very comfortably controlled by an overpressure of steam and also by the shape of an introducing provisions, which may be a simple tube, tubular cross, an oval or ring with many openings, or a sintered-glass shower.

For the purpose of clinical experiments, the sorbents were placed into a polypropylene column built from two identical halves, which were formed from three mutually linked parts with a shape of frustrum of a cone. The surface-modified sorbent is placed between two supporting partitions which also serve as strainers. The volume of column may be 850 or 420 ml. The ends of column are provided with funnel-like elements, the narrowed parts of which serve for connection of blood sets.

Clinical tests revealed an excellent hemocompatibility of the sorbents, which were coated by the method according to the invention. The blood pressure never changed by more than 10 Torr (1.33 kPa) during perfusion and neither hemolysis nor blood clotting were observed. Clinical complications never occurred and the perfusions were very well subjectively tolerated in all cases. The average number of leucocytes and blood platelets was, at the end of hemoperfusion lasting for hours, $67.6 \pm 25.2\%$ and $103.1 \pm 12.7\%$ of the original value, respectively (n=10). After dismantling the column, the surface of sorbent was without blood precipitate or trapped blood elements.

The invention is more in-depth described in the following examples of performance, without limiting its scope to them.

The amount of biocompatible polymer was determined as the weight increase of gel after drying an aliquot to constant weight.

EXAMPLE 1

A solution of 225 g poly(2-hydroxyethyl methacrylate) in 1500 ml mixture ethanol-water 1:1 was poured on 10 kg of perfectly purified styrene-divinylbenzene gel of particle size 0.3-1 mm, during agitation with a vigorous stream of steam. The suspension was blown with steam as long as the last traces of ethanol were removed. The amount of polymer in gel, which was determined as a weight increase, was about 2%.

EXAMPLE 2

A styrene-divinylbenzene copolymer (2500 g) of particle size 1.5-3 mm was agitated with a stream of steam and coated by addition of 25 g copolymer of 2-hydroxyethyl methacrylate with 0.5% ethylene dimethacrylate in 800 ml mixture methanol-water 2:3. The increase in weight of the sorbent amounted, after removal of methanol, 0.5%.

EXAMPLE 3

A thoroughly purified divinylbenzene resin (1500 g) of particle size 0.3 mm was agitated and heated to about 70° C. with a vigorous stream of steam and then surface-modified by addition of a solution of 60 g copolymer of 2-hydroxyethyl methacrylate with 0.2% ethylene dimethacrylate in 1200 ml mixture ethanol—water 4:1. The increase in weight of the sorbent was 3.2%.

EXAMPLE 4

A solution of 10 g poly(2-hydroxyethyl methacrylate) in 150 ml methanol was poured in parts to 500 g of styrene-ethylene dimethacrylate copolymer of particle size 0.3-2 mm under agitation with a stream of steam. The weight increase of sorbent, after removal of methanol, was 1.7%.

EXAMPLE 5

A solution of 75 g poly(2-hydroxyethy methacrylate) in 500 ml mixture ethanol-water 3:2 was poured in parts to 1000 g of styrene-acrylonitrile-divinylbenzene resin of particle size 0.2-0.3 mm under agitation with a very intense stream of steam. The increase in sorbent weight amounted to 6.9%.

EXAMPLE 6

An acrylonitrile-divinylbenzene copolymer (100 g) of particle size 0.2 mm was surface-modified with a solution of 8 g copolymer of 2-hydroxyethyl methacrylate with 0.3% ethylene dimethacrylate in 750 ml mixture methanol-water 1:4 under stirring with steam. The increase in sorbent weight amounted to 8.2%.

EXAMPLE 7

A mixture of 10 g 2-hydroxyethyl methacrylate with aqueous solutions of ammonium persulfate and sodium disulfite was poured to 50 g of polystyrene gel of particle size 0.1-0.5 mm under stirring with a very intense stream of steam. The increase in sorbent weight amounted to 15.2%.

We claim:

1. Method for producing a biocompatible layer on the surface of particles of porous synthetic sorbents, wherein a solution of biocompatible polymer of the acrylate or methacrylate type, or its monomer in the presence of polymerization initiators, acts on a suspension of the sorbent, which is stirred by steam, said biocompatible polymer forming on the surface of said particles as a thin coherent layer, such that the resulting coated particles retain their initial sorption capacity.

2. The method according to claim 1, wherein an alcohol with 1 to 2 carbon atoms, or its mixture with water or aqueous solutions of salts, is used as a solvent of the biocompatible polymer.

3. The method according to claim 1, wherein the biocompatible polymer is poly(2-hydroxyethyl methacrylate).

4. The method according to claim 1, wherein the biocompatible polymer is crosslinked poly(2-hydroxyethyl methacrylate).

5. The method according to claim 1, wherein 2-hydroxyethyl methacrylate as such or in the presence of ethylen dimethacrylate is used as the monomer.

6. The method according to claim 1, wherein water-soluble initiators of radical polymerization are used to initiate the polymerization of monomer.

* * * * *